United States Patent
Jiang et al.

(10) Patent No.: US 12,212,991 B2
(45) Date of Patent: *Jan. 28, 2025

(54) CHANNEL MONITORING INDICATION METHOD, TERMINAL, AND NETWORK DEVICE

(71) Applicant: VIVO MOBILE COMMUNICATION CO., LTD., Guangdong (CN)

(72) Inventors: Dajie Jiang, Guangdong (CN); Zichao Ji, Guangdong (CN); Xueming Pan, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,191

(22) Filed: Oct. 13, 2023

(65) Prior Publication Data
US 2024/0064544 A1 Feb. 22, 2024

Related U.S. Application Data

(63) Continuation of application No. 17/146,522, filed on Jan. 12, 2021, now Pat. No. 11,838,746, which is a
(Continued)

(30) Foreign Application Priority Data
Jul. 13, 2018 (CN) .......................... 201810776801.5

(51) Int. Cl.
*H04W 24/08* (2009.01)
*H04L 1/00* (2006.01)
(Continued)

(52) U.S. Cl.
CPC .......... *H04W 24/08* (2013.01); *H04L 1/0003* (2013.01); *H04L 1/0061* (2013.01);
(Continued)

(58) Field of Classification Search
CPC ............ H04W 24/08; H04W 72/0446; H04W 72/0466; H04W 72/23; H04W 76/11;
(Continued)

(56) References Cited

U.S. PATENT DOCUMENTS 11,838,746 B2 * 12/2023 Jiang ..................... H04W 72/23
2012/0250625 A1 * 10/2012 Kim ....................... H04L 5/0098
370/328
(Continued)

FOREIGN PATENT DOCUMENTS

| CN | 101841892 A | 9/2010 |
|---|---|---|
| CN | 102123524 A | 7/2011 |

(Continued)

OTHER PUBLICATIONS

SHARP: 11 Dynamic update of PDCCH 1-15 monitoring set 11, 3GPP Draft; RI-101373, 3rd Generation Partnership Project {3GPP), Mobile Competence Centre; 650, Route Des Lucioles ; F-06921 3ophia-Antipolis Cedex; France, vol. RAN WGl, No. San Francisco, USA; Feb. 22, 2010, Feb. 16, 2010 (Feb. 16, 2010), XP050418858, [retrieved on Feb. 16, 2010].
(Continued)

*Primary Examiner* — Harry H Kim
(74) *Attorney, Agent, or Firm* — BROOKS KUSHMAN P.C.

(57) ABSTRACT

A channel monitoring indication method, a terminal, and a network device are provided. The method includes: monitoring a first physical downlink control channel PDCCH; and if downlink control information (DCI) not used for scheduling is received on the first PDCCH, determining, based on the DCI not used for scheduling, whether to monitor a second PDCCH.

20 Claims, 3 Drawing Sheets

Monitor a first physical downlink control channel PDCCH — 21

If downlink control information (DCI) not used for scheduling is received on the first PDCCH, determine, based on the DCI not used for scheduling, whether to monitor a second PDCCH — 22

Related U.S. Application Data continuation of application No. PCT/CN2019/095365, filed on Jul. 10, 2019.

(51) Int. Cl.

| | | |
|---|---|---|
| *H04L 1/1812* | (2023.01) | |
| *H04L 1/1822* | (2023.01) | |
| *H04L 1/1829* | (2023.01) | |
| *H04L 5/00* | (2006.01) | |
| *H04W 48/12* | (2009.01) | |
| *H04W 52/02* | (2009.01) | |
| *H04W 72/044* | (2023.01) | |
| *H04W 72/0446* | (2023.01) | |
| *H04W 72/23* | (2023.01) | |
| *H04W 72/232* | (2023.01) | |
| *H04W 76/11* | (2018.01) | |
| *H04W 76/27* | (2018.01) | |
| *H04W 76/28* | (2018.01) | |

(52) U.S. Cl.
CPC .......... *H04L 1/1819* (2013.01); *H04L 5/0055* (2013.01); *H04W 72/0446* (2013.01); *H04W 72/0466* (2013.01); *H04W 72/23* (2023.01); *H04W 76/11* (2018.02); *H04W 76/27* (2018.02); *H04W 76/28* (2018.02)

(58) Field of Classification Search
CPC . H04W 76/27; H04W 76/28; H04W 52/0216; H04W 52/0229; H04W 52/028; H04W 48/12; H04W 52/0212; H04L 1/0003; H04L 1/0061; H04L 1/1819; H04L 5/0055; H04L 1/1835; H04L 1/1822; H04L 1/1864; H04L 5/0053; Y02D 30/70
See application file for complete search history.

(56) References Cited

U.S. PATENT DOCUMENTS

| | | | |
|---|---|---|---|
| 2013/0040675 A1* | 2/2013 | Ant | H04W 52/226 |
| | | | 455/509 |
| 2016/0014751 A1 | 1/2016 | Papasakellariou et al. | |
| 2016/0219557 A1 | 7/2016 | He et al. | |
| 2017/0332377 A1 | 11/2017 | Tseng et al. | |
| 2019/0082458 A1* | 3/2019 | Hu | H04W 72/044 |
| 2019/0140725 A1 | 5/2019 | Aiba et al. | |
| 2020/0029355 A1* | 1/2020 | Liu | H04W 72/23 |
| 2020/0059904 A1* | 2/2020 | Takeda | H04W 52/02 |
| 2020/0177322 A1* | 6/2020 | Xu | H04L 1/1893 |
| 2020/0328850 A1* | 10/2020 | Feng | H04W 72/0446 |
| 2020/0374091 A1* | 11/2020 | Shao | H04L 5/0055 |

FOREIGN PATENT DOCUMENTS

| | | |
|---|---|---|
| CN | 103095396 A | 5/2013 |
| JP | 2017204863 A | 11/2017 |
| WO | 2010124444 A1 | 11/2010 |
| WO | 2017187697 A1 | 11/2017 |

OTHER PUBLICATIONS

Supplementary European Search Report, dated Aug. 8, 2021, issued in EP19834999.
First Office Action for Japanese Application No. 2021-500430, dated Jan. 26, 2022, 3 Pages.
ISR and Written Opinion received for PCT Application No. PCT/CN2019/095365, mailed on Jan. 28, 2021, 7 pages and 5 pages of English Translation.
First Office Action for Korean Application No. 10-2021-7003447, dated Sep. 26, 2023, 5 Pages.
Qualcomm Incorporated "Advanced Grant Indication for UE Power Saving" 3GPP TSG RAN WG1 #91, Reno, NV, USA, Nov. 2017, R1-1720709, 5 Pages.
Ericsson "DRX with short onDuration and Wake-up signaling" 3GPP TSG-RAN WG2 AH 1807, Montreal, Canada, Jul. 2018, R2-1810058, 3 Pages.

* cited by examiner

Send a first physical downlink control channel PDCCH, where the first PDCCH carries downlink control information (DCI) not used for scheduling, and the DCI not used for scheduling is used to indicate whether a terminal is to monitor a second PDCCH  51

CHANNEL MONITORING INDICATION METHOD, TERMINAL, AND NETWORK DEVICE

CROSS-REFERENCE TO RELATED APPLICATIONS

This application is a continuation application of U.S. patent application Ser. No. 17/146,522 filed on Jan. 12, 2021, which is a continuation of International Application No. PCT/CN2019/095365 filed on Jul. 10, 2019, which claims priority to Chinese Patent Application No. 201810776801.5 filed on Jul. 13, 2018, which are incorporated herein by reference in their entireties.

TECHNICAL FIELD

This disclosure relates to the field of communications technologies, and in particular, to a channel monitoring indication method, a terminal, and a network device.

BACKGROUND

In a mobile communications system, a monitoring period, a monitoring offset (offset), and monitoring duration (duration) of a physical downlink control channel (Physical Downlink Control Channel, PDCCH) are all notified by a network device to a terminal by radio resource control (Radio Resource Control, RRC) signaling. However, the PDCCH monitoring period configured by the network device may be inappropriate. For example, if a service packet arrival period is 20 ms, but the PDCCH monitoring period configured by the network device is 2 ms, the terminal is caused to blindly detect the PDCCH frequently, without detecting grant information (including an uplink grant and a downlink grant). Therefore, PDCCH blind detection performed by the terminal based on an inappropriate configuration is disadvantageous for power saving of the terminal.

SUMMARY

According to a first aspect, an embodiment of this disclosure provides a channel monitoring indication method, applied to a terminal and including:
  monitoring a first physical downlink control channel PDCCH; and
  if downlink control information (DCI) not used for scheduling is received on the first PDCCH, determining, based on the DCI not used for scheduling, whether to monitor a second PDCCH.

According to a second aspect, an embodiment of this disclosure further provides a terminal, including:
  a first monitoring module, adapted to monitor a first physical downlink control channel PDCCH; and
  a second monitoring module, adapted to: if downlink control information (DCI) not used for scheduling is received on the first PDCCH, determine, based on the DCI not used for scheduling, whether to monitor a second PDCCH.

According to a third aspect, an embodiment of this disclosure provides a terminal. The terminal includes a processor, a memory, and a computer program stored in the memory and capable of running on the processor. When the computer program is executed by the processor, the steps of the foregoing channel monitoring indication method are implemented.

According to a fourth aspect, an embodiment of this disclosure provides a channel monitoring indication method, applied to a network device and including:
  sending a first physical downlink control channel PDCCH, where the first PDCCH carries downlink control information (DCI) not used for scheduling, and the DCI not used for scheduling is used to indicate whether a terminal is to monitor a second PDCCH.

According to a fifth aspect, an embodiment of this disclosure provides a network device, including:
  a first sending module, adapted to send a first physical downlink control channel PDCCH, where the first PDCCH carries downlink control information (DCI) not used for scheduling, and the DCI not used for scheduling is used to indicate whether a terminal is to monitor a second PDCCH.

According to a sixth aspect, an embodiment of this disclosure further provides a network device. The network device includes a processor, a memory, and a computer program stored in the memory and capable of running on the processor. When the processor executes the computer program, the steps of the foregoing channel monitoring indication method applied to a network device side are implemented.

According to a seventh aspect, an embodiment of this disclosure provides a computer-readable storage medium. The computer-readable storage medium stores a computer program, and when the computer program is executed by a processor, the steps of the foregoing channel monitoring indication method applied to a network device side are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DETAILED DESCRIPTION

The following describes exemplary embodiments of this disclosure in more detail with reference to the accompanying drawings. Although the exemplary embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

In the specification and claims of this application, the terms such as "first" and "second" are intended to distinguish between similar objects but do not necessarily indicate a specific order or sequence. It should be understood that the numbers used in this way is interchangeable in appropriate circumstances so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device. The term "and/or" used in this specification and claims indicates at least one of connected objects.

Technologies described in this specification are not limited to a long term evolution (Long Time Evolution, LTE) or LTE-Advanced (LTE-Advanced, LTE-A) system, and may also be applied to various wireless communications systems, for example, code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems. The terms "system" and "network" are usually used interchangeably. The technologies described in this specification may be used in the foregoing systems and radio technologies, and may also be used in other systems and radio technologies. However, in the following descriptions, a new radio (New Radio, NR) system is described for an illustration purpose, and NR terms are used in most of the following descriptions, although these technologies may also be applied to other systems than the NR system application.

Examples provided in the following descriptions are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 1:
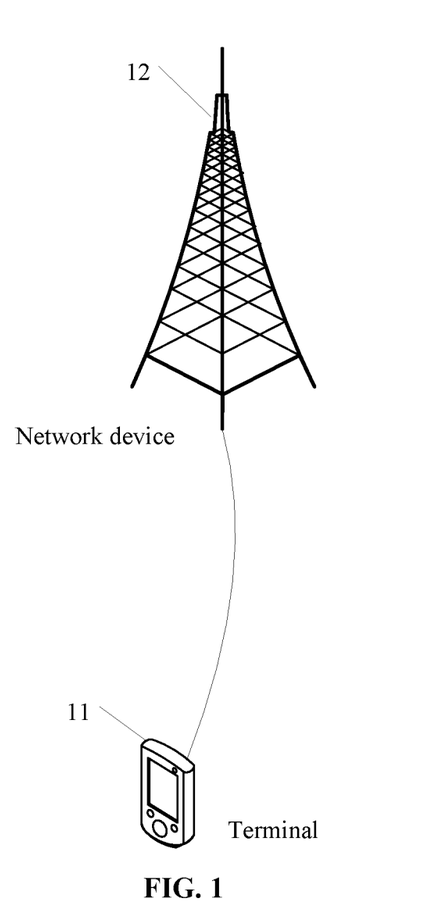
FIG. 1 presents a block diagram of a mobile communications system to which an embodiment of this disclosure may be applied.

FIG. 1 shows a block diagram of a wireless communications system to which an embodiment of this disclosure may be applied. The wireless communications system includes a terminal 11 and a network device 12. The terminal 11 may also be referred to as a terminal device or user equipment (User Equipment, UE). The terminal 11 may be a terminal-side device such as a mobile phone, a tablet computer (Tablet Personal Computer), a laptop computer (Laptop Computer), a personal digital assistant (Personal Digital Assistant, PDA), a mobile Internet device (Mobile Internet Device, MID), a wearable device (Wearable Device), or a vehicle-mounted device. It should be noted that a specific type of the terminal 11 is not limited in this embodiment of this disclosure. The network device 12 may be a base station or a core network. The base station may be a 5G base station or a base station of a later release (for example, a gNB or a 5G NR NB), or a base station in another communications system (for example, an eNB, a wireless local area network (Wireless Local Area Network, WLAN) access point, or another access point). The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a NodeB, an evolved NodeB (eNB), a home NodeB, a home evolved NodeB, a WLAN access point, a Wireless Fidelity (Wireless Fidelity, Wi-Fi) node, or another appropriate term in the art. As long as a same technical effect is achieved, the base station is not limited to a specific technical term. It should be noted that only a base station in an NR system is used as an example in this embodiment of this disclosure, but a specific type of the base station is not limited.

Under control of a base station controller, the base station may communicate with the terminal 11. In various examples, the base station controller may be a part of the core network or some base stations. Some base stations may communicate control information or user data with the core network by using backhauls. In some examples, some of these base stations may communicate with each other directly or indirectly by using backhaul links. The backhaul links may be wired or wireless communications links. The wireless communications system may support operations on multiple carriers (wave signals of different frequencies). A multi-carrier transmitter can transmit modulated signals on the multiple carriers simultaneously. For example, multi-carrier signals modulated by using various radio technologies may be transmitted on each communications link. Each modulated signal may be sent on different carriers and may carry control information (for example, a reference signal or a control channel), overhead information, data, and the like.

The base station may perform wireless communication with the terminal 11 by using one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, for example, a cell or WLAN radio access technology. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communications link in the wireless communications system may include an uplink for carrying uplink (Uplink, UL) transmission (for example, from the terminal 11 to the network device 12) or a downlink for carrying downlink (Downlink, DL) transmission (for example, from the network device 12 to the terminal 11). UL transmission may also be referred to as reverse link transmission, and DL transmission may also be referred to as forward link transmission.

Figure 2:
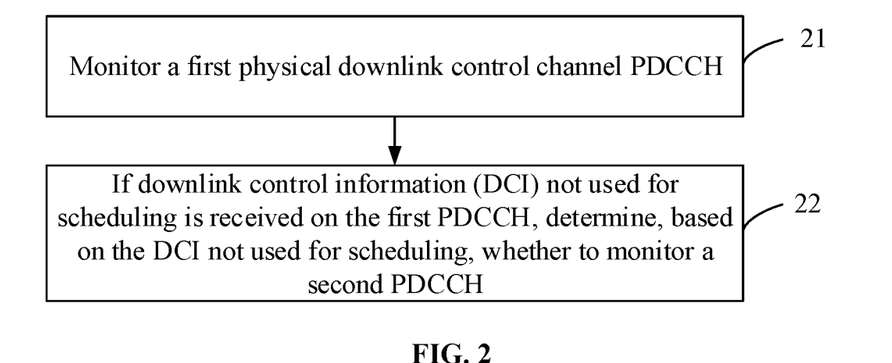
FIG. 2 presents a schematic flowchart of a channel monitoring indication method applied to a terminal according to an embodiment of this disclosure.

An embodiment of this disclosure provides a channel monitoring indication method, applied to a terminal. As shown in FIG. 2, the method includes the following steps.

Step 21: Monitor a first physical downlink control channel PDCCH.

A monitoring parameter of the first PDCCH is configured by a network device; and the monitoring parameter includes at least one of a monitoring period, a monitoring offset, and monitoring duration.

Step 22: If downlink control information (DCI) not used for scheduling is received on the first PDCCH, determine, based on the DCI not used for scheduling, whether to monitor a second PDCCH.

The downlink control information (Downlink Control Information, DCI) not used for scheduling may indicate whether a terminal is to monitor the second PDCCH. Because the DCI not used for scheduling dynamically indicates a monitoring behavior of the terminal, unnecessary PDCCH monitoring performed by the terminal can be avoided, and power consumption of the terminal is reduced.

It should be noted that a manner of determining a monitoring behavior on the first PDCCH may be the same as or different from a manner of determining a monitoring behavior on the second PDCCH. For example, the monitoring behavior on the first PDCCH may be determined based on DCI not used for scheduling on a previous PDCCH, or the monitoring behavior on the first PDCCH is determined based on target signaling (such as RRC signaling).

Further, after step 21, the method further includes: if the DCI not used for scheduling is not received on the first PDCCH, monitoring the second PDCCH based on received target signaling, where the target signaling is different from the DCI not used for scheduling, and the target signaling is used to indicate a monitoring parameter related to the second PDCCH. The monitoring parameter related to the second PDCCH includes at least one of a monitoring period, a monitoring offset (offset), and monitoring duration (duration). Herein, the target signaling includes but is not limited to a medium access control (Medium Access Control, MAC) control element (Control Element, CE), RRC signaling, or the like. Using the RRC signaling as an example, the terminal monitors the second PDCCH based on a search space (search space) monitoring parameter configured by using the RRC signaling.

The second PDCCH in this embodiment of this disclosure corresponds to at least one DCI format (format), and/or the second PDCCH corresponds to at least one search space. DCI formats include but are not limited to the formats shown in the following Table 1.

TABLE 1

| DCI format (format) | Meaning |
|---|---|
| 0_0 | Scheduling of physical uplink shared channel (Physical Uplink Shared Channel, PUSCH) in one cell |
| 0_1 | Scheduling of PUSCH in one cell |
| 1_0 | Scheduling of physical downlink shared channel (Physical Downlink Shared Channel, PDSCH) in one cell |
| 1_1 | Scheduling of PDSCH in one cell |
| 2_0 | Notifying a group of UEs of the slot format |
| 2_1 | Notifying a group of UEs of the physical resource blocks (Physical Resource Block, PRB) and OFDM symbols where UE may assume that no downlink transmission is intended for the UE |

TABLE 1-continued

| DCI format (format) | Meaning |
|---|---|
| 2_2 | Transmission of Transmit power control TPC commands for physical uplink control channel (Physical Uplink Control Channel, PUCCH) and PUSCH |
| 2_3 | Transmission of a group of TPC commands for sounding reference signal (Sounding Reference Signal, SRS) transmissions by one or more UEs |

DCI formats 0_0, 0_1, 1_0, and 1_1 are scheduling DCI, and other DCI formats are DCI not used for scheduling.

Further, a system supports but is not limited to the following different types of PDCCH search spaces (Search space):

1. Type0-PDCCH common search space, where this type of search space is defined for a PDCCH corresponding to remaining minimum system information (Remaining Minimum System Information, RMSI), and a downlink control information (Downlink Control Information, DCI) format (format) carried on a PDCCH detected in this type of search space carries a cyclic redundancy check (Cyclic Redundancy Check, CRC) scrambled (scrambled) by a system information radio network temporary identifier (System Information Radio Network Temporary Identifier, SI-RNTI) corresponding to a primary cell (Primary Cell, PCell);

2. Type0A-PDCCH common search space, where this type of search space is defined for a PDCCH corresponding to other system information (Other System Information, OSI), and a DCI format carried on a PDCCH detected in this type of search space carries a CRC scrambled by an SI-RNTI corresponding to a primary cell PCell;

3. Type1-PDCCH common search space, where this type of search space is defined for an ordinary PDCCH (or referred to as a normal PDCCH), and a DCI format carried on a PDCCH detected in this type of search space carries a CRC scrambled by a random access radio network temporary identifier (Random Access Radio Network Temporary Identifier, RA-RNTI), a temporary cell radio network temporary identifier (Temporary Cell Radio Network Temporary Identifier, TC-RNTI), or a cell radio network temporary identifier (Cell Radio Network Temporary Identifier, C-RNTI) corresponding to a primary cell PCell;

4. Type2-PDCCH common search space, where a DCI format carried on a PDCCH detected in this type of search space carries a CRC scrambled by a paging radio network temporary identifier (Paging Radio Network Temporary Identifier, P-RNTI) corresponding to a primary cell PCell;

5. Type3-PDCCH common search space, where a DCI format carried on a PDCCH detected in this type of search space carries a CRC scrambled by an interruption radio network temporary identifier (Interruption Radio Network Temporary Identifier, INT-RNTI), a slot format indication radio network temporary identifier (Slot Format Indication Radio Network Temporary Identifier, SFI-RNTI), a transmit power control (Transmit Power Control, TPC) for PUSCH radio network temporary identifier (TPC for PUSCH Radio Network Temporary Identifier, TPC-PUSCH-RNTI), a TPC for PUCCH radio network temporary identifier (TPC for PUCCH Radio Network Temporary Identifier, TPC-PUCCH-RNTI), a C-RNTI, a configured scheduling radio network temporary identifier (Configured Scheduling Radio Network Temporary Identifier, CS-RNTI), or a semi persistent scheduling-radio network temporary identifier (Semi persistent scheduling Radio Network Temporary Identifier, SPS-RNTI); and 6. UE-specific search space (UE-specific search space), where a DCI format carried on a PDCCH detected in this type of search space carries a CRC scrambled by a C-RNTI, a CS-RNTI, or an SP-RNTI.

The second PDCCH in this embodiment of this disclosure corresponds to at least one of the foregoing search spaces.

In addition, the cyclic redundancy check CRC of the DCI not used for scheduling in this embodiment of this disclosure is scrambled by using a target radio network temporary identifier RNTI, and the target RNTI is a cell radio network temporary identifier C-RNTI or a dedicated RNTI.

After step 21, the method further includes: if the DCI not used for scheduling is received on the first PDCCH, feeding back acknowledgement ACK information; or if the DCI not used for scheduling is not received on the first PDCCH, feeding back negative acknowledgement NACK information. To be specific, if it is defined that the terminal sends only the ACK information, the terminal feeds back the acknowledgement ACK information when the terminal has received the DCI not used for scheduling on the first PDCCH; or does not send any feedback information when the terminal has not received the DCI not used for scheduling on the first PDCCH. If it is defined that the terminal sends only the NACK information, the terminal does not send any feedback information when the terminal has received the DCI not used for scheduling on the first PDCCH, or feeds back the NACK information when the terminal has not received the DCI not used for scheduling on the first PDCCH. If it is defined that the terminal may not only send the ACK information but also send the NACK information, the terminal feeds back the ACK information when the terminal has received the DCI not used for scheduling on the first PDCCH, or feeds back the NACK information when the terminal has not received the DCI not used for scheduling on the first PDCCH.

A start time of the foregoing step 22, that is, in the DCI not used for scheduling, an effective time of a first indication field indicating a monitoring behavior of the terminal, is one of the following:

a slot next to a slot in which the DCI not used for scheduling is located, that is, a next slot after the terminal receives the DCI not used for scheduling;

a slot subsequent to a time gap after a slot in which the DCI not used for scheduling is located, where the gap is predefined or is configured by the network device; to be specific, a gap exists between reception of the DCI not used for scheduling and the effective time of the indication field, and in the gap, the terminal performs PDCCH monitoring based on a previous monitoring behavior rule, that is, the terminal does not monitor the PDCCH in the gap based on the DCI not used for scheduling but monitors the PDCCH based on received target signaling, where the target signaling is different from the DCI not used for scheduling, for example, the target signaling is RRC signaling; and an $M^{th}$ slot after a slot in which the ACK information corresponding to the DCI not used for scheduling is located, where M is a positive integer, and a value of M may be predefined or may be configured by the network device.

In this embodiment of this disclosure, the DCI not used for scheduling includes a first indication field used to indicate at least one of the following monitoring behaviors of the terminal (for example, the first PDCCH is a dedicated PDCCH for the terminal) or a terminal group to which the terminal belongs (for example, the first PDCCH is a group-common PDCCH):

Monitoring behavior 1: Not monitoring the second PDCCH within a first transmission time. The first indication field includes indication bits used to indicate that the terminal or the terminal group is not to monitor the second PDCCH within the first transmission time. The first transmission time is N time domain transmission units, N second PDCCH monitoring (monitoring) periods, or N monitoring time domain transmission units in a second PDCCH monitoring period, where the time domain transmission unit includes a slot, a mini-slot, a millisecond, or a time domain symbol, and N is a positive integer. Using the slot as an example, the DCI not used for scheduling includes a first indication field used to indicate that the second PDCCH is not to be monitored in subsequent N slots, N PDCCH monitoring periods, or N monitoring slots in a PDCCH monitoring period. In addition, the first indication field may further indicate that the network device is not to send the second PDCCH in the subsequent N slots, the N PDCCH monitoring periods, or the N monitoring slots in the PDCCH monitoring period. This indirectly indicates that the terminal or the terminal group does not need to monitor the second PDCCH in the period.

Monitoring behavior 2: Monitoring the second PDCCH within a second transmission time or not. The first indication field includes indication bits used to indicate whether to monitor the second PDCCH within the second transmission time. For example, the indication bits in the first indication field form a bitmap (bitmap). A position of each bit in the bitmap represents a position of a different time domain transmission unit, a different monitoring (monitoring) period, or a different monitoring time domain transmission unit in a monitoring period. For example, in a 5-bit bitmap, a first bit represents a first slot within the second transmission time, a second bit represents a second slot in the second transmission time, and so on. Assuming that the first indication field includes a bitmap formed by N bits, the second transmission time is N time domain transmission units, N second PDCCH monitoring (monitoring) periods, or N monitoring time domain transmission units in a second PDCCH monitoring period, where the time domain transmission unit includes a slot, a mini-slot, a millisecond, or a time domain symbol, and N is a positive integer. For a bit in the bitmap, a value "1" is used to indicate that the second PDCCH needs to be monitored on a time domain transmission unit corresponding to the bit, and a value "0" is used to indicate that the second PDCCH does not need to be monitored on the time domain transmission unit corresponding to the bit; or vice versa. It should be noted that a value of N corresponding to the first transmission time may be the same as or different from a value of N corresponding to the second transmission time. This is not specifically limited in this embodiment.

Monitoring behavior 3: Monitoring parameter related to the second PDCCH. The monitoring parameter related to the second PDCCH includes at least one of a monitoring period, a monitoring offset, and monitoring duration. For example, the first indication field includes two bits, where 00 indicates that the monitoring period is 5 slots, 01 indicates that the monitoring period is 10 slots, 10 indicates that the monitoring period is 20 slots, and 11 represents other purposes.

Further, the first indication field is used to indicate that the monitoring parameter related to the second PDCCH is one parameter in a monitoring parameter candidate set, and the monitoring parameter candidate set is indicated by the network device by using radio resource control RRC signaling. To be specific, the network device indicates the monitoring parameter candidate set by using the radio resource control RRC signaling, the monitoring parameter candidate set includes at least one monitoring parameter related to the second PDCCH, and the indication field is used to indicate one parameter in the monitoring parameter candidate set. For example, the network device configures a monitoring parameter 1 (for example, the monitoring period is 5 slots), a monitoring parameter 2 (for example, the monitoring period is 10 slots), and a monitoring parameter 3 (for example, the monitoring period is 15 slots) by using the RRC signaling. Optionally, the first indication field in the scheduling DCI is used to indicate which monitoring parameter is selected, that is, one of the monitoring parameters 1, 2, and 3 is selected.

Monitoring behavior 4: Connected discontinuous reception (Connected Discontinuous Reception, CDRX) parameter, where the CDRX parameter includes at least one of a CDRX cycle, a CDRX offset, and a CDRX onduration period (or referred to as an onduration timer).

Further, in a manner similar to the foregoing monitoring parameter indication manner, the first indication field is used to indicate that the CDRX parameter is one parameter in a CDRX parameter candidate set, and the CDRX parameter candidate set is indicated by the network device by using radio resource control RRC signaling. To be specific, the network device indicates the CDRX parameter candidate set by using the radio resource control RRC signaling, the CDRX parameter candidate set includes at least one CDRX parameter, and the indication field is used to indicate one parameter in the CDRX parameter candidate set. For example, the network device configures a CDRX parameter 1 (for example, the DRX cycle is 160 ms), a CDRX parameter 2 (for example, the DRX cycle is 320 ms), and a CDRX parameter 3 (for example, the DRX cycle is 1280 ms) by using the RRC signaling. Optionally, the first indication field in the scheduling DCI is used to indicate which CDRX parameter is selected, that is, one of the CDRX parameters 1, 2, and 3 is selected.

Monitoring behavior 5: Monitoring the second PDCCH based on received target signaling, where the target signaling is different from the DCI not used for scheduling, and the target signaling is used to indicate a monitoring parameter related to the second PDCCH. Same as the foregoing target signaling, the target signaling may include but is not limited to a MAC layer CE, RRC signaling, and the like. Using the RRC signaling as an example, the terminal monitors the second PDCCH based on a search space (search space) monitoring parameter configured by using the RRC signaling.

The DCI not used for scheduling in this embodiment of this disclosure may use a dedicated DCI format, that is, a DCI not used for scheduling format specially used for indicating a monitoring behavior of the terminal or the terminal group is added, where a size of the dedicated DCI format may be consistent or inconsistent with that of the DCI format (as shown in the foregoing Table 1) in the related art. Alternatively, the DCI not used for scheduling may use one of preset scheduling DCI formats or preset DCI not used for scheduling formats. Herein, the preset scheduling DCI formats may be the DCI formats 0_0, 0_1, 1_0, and 1_1 listed in the foregoing Table 1, and the preset DCI not used for scheduling formats may be other DCI formats in the foregoing Table 1. When the DCI not used for scheduling uses one of the preset scheduling DCI formats or the preset DCI not used for scheduling formats, a length of the DCI not used for scheduling is consistent with that of the DCI format in the related art, so that complexity of blind detection by the terminal can be reduced.

When the DCI not used for scheduling uses one of the preset scheduling DCI formats, the indication field includes at least one of the following fields in the preset scheduling DCI format: a hybrid automatic repeat request process number (HARQ process number) field, a redundancy version (Redundancy version) field, a modulation and coding scheme (Modulation and coding scheme) field, and a resource block assignment (Resource block assignment) field.

The following uses some fields in the DCI not used for scheduling format again as an example for exemplarily describing an indication of a monitoring behavior. An indication of a separate monitoring behavior or a combination of other monitoring behaviors is similar thereto, and is not described in this embodiment.

The CRC is scrambled by using the C-RNTI, and the hybrid automatic repeat request process number field, the redundancy version field, the modulation and coding scheme field, and the resource block assignment field are rewritten, as shown in the following Tables 2 to 6, to indicate whether the terminal or the terminal group is to monitor the second PDCCH.

TABLE 2

| DCI field | Field meaning |
| --- | --- |
| Hybrid automatic repeat request process number | Set to all 1s |
| Redundancy version | Set to 11 |
| Modulation and coding scheme | Indicating whether to monitor the second PDCCH |
| Resource block assignment | Indicating whether to monitor the second PDCCH |

TABLE 3

| DCI field | Field meaning |
| --- | --- |
| Hybrid automatic repeat request process number | Set to all 1s |
| Redundancy version | Set to 11 |
| Modulation and coding scheme | Indicating whether to monitor the second PDCCH |
| Resource block assignment | Set to all 1s |

TABLE 4

| DCI field | Field meaning |
| --- | --- |
| Hybrid automatic repeat request process number | Set to all 1s |
| Redundancy version | Set to 11 |
| Modulation and coding scheme | Indicating whether to monitor the second PDCCH |
| Resource block assignment | Set to all 0s |

TABLE 5

| DCI field | Field meaning |
|---|---|
| Hybrid automatic repeat request process number | Set to all 1s |
| Redundancy version | Set to 11 |
| Modulation and coding scheme | Set to all 1s |
| Resource block assignment | Indicating whether to monitor the second PDCCH |

TABLE 6

| DCI field | Field meaning |
|---|---|
| Hybrid automatic repeat request process number | Set to all 1s |
| Redundancy version | Set to 11 |
| Modulation and coding scheme | Set to all 0s |
| Resource block assignment | Indicating whether to monitor the second PDCCH |

The foregoing rewriting manner is used only as an example for description. Other rewriting manners may also be applicable to this embodiment of this disclosure, and are not exhaustively illustrated herein.

Further, when the first indication field in the DCI not used for scheduling indicates that the monitoring behavior is 1 and/or 2, before step 21, the method further includes: sending report information to the network device, where the report information is used to indicate that the second PDCCH is not to be monitored within the first transmission time, or used to indicate whether the second PDCCH is to be monitored within the second transmission time. To be specific, the terminal sends report information to the network device according to a scheduling requirement of the terminal, and when there is no scheduling requirement, transmits report information indicating that the second PDCCH is not to be monitored within the first transmission time, or reports, based on a service scheduling requirement, report information indicating whether the second PDCCH is to be monitored within the second transmission time. The network device may generate the DCI not used for scheduling by referring to the report information, to indicate a subsequent monitoring behavior of the terminal.

In addition, it should be noted that the DCI not used for scheduling in this embodiment of this disclosure may further include a second indication field used to indicate a new data indication (New Data Indication, NDI) of an uplink hybrid automatic repeat request HARQ process. This indication field is used to instruct the terminal or the terminal group to release a soft buffer (soft buffer). Specifically, for uplink transmission, each HARQ process may correspond to one NDI.

For the terminal in the channel monitoring indication method in this embodiment of this disclosure, the DCI not used for scheduling is used to dynamically indicate whether to monitor the PDCCH, so that the terminal monitors the PDCCH more flexibly. This can avoid unnecessary PDCCH monitoring and is advantageous for power saving of the terminal.

The channel monitoring indication method in different scenarios is described in the foregoing embodiment. With reference to an accompanying drawing, the following further describes a terminal corresponding to the channel monitoring indication method.

Figure 3:
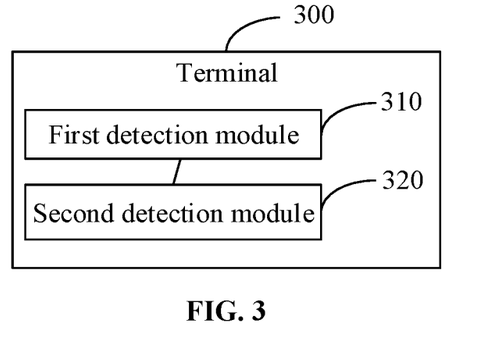
FIG. 3 presents a schematic modular structural diagram of a terminal according to an embodiment of this disclosure.

As shown in FIG. 3, a terminal 300 in an embodiment of this disclosure can implement details of the method in the foregoing embodiment, that is, monitoring a first physical downlink control channel PDCCH, and if downlink control information (DCI) not used for scheduling is received on the first PDCCH, determining, based on the DCI not used for scheduling, whether to monitor a second PDCCH, and can achieve a same effect. The terminal 300 specifically includes the following functional modules:

a first monitoring module 310, adapted to monitor a first physical downlink control channel PDCCH; and a second monitoring module 320, adapted to: if downlink control information (DCI) not used for scheduling is received on the first PDCCH, determine, based on the DCI not used for scheduling, whether to monitor a second PDCCH.

The terminal 300 further includes:

a third monitoring module, adapted to: if the DCI not used for scheduling is not received on the first PDCCH, monitor the second PDCCH based on received target signaling, where the target signaling is different from the DCI not used for scheduling, and the target signaling is used to indicate a monitoring parameter related to the second PDCCH.

A cyclic redundancy check CRC of the DCI not used for scheduling is scrambled by using a target radio network temporary identifier RNTI, and the target RNTI is a cell radio network temporary identifier C-RNTI or a dedicated RNTI.

The terminal 300 further includes:

a first feedback module, adapted to feed back acknowledgement ACK information if the DCI not used for scheduling is received on the first PDCCH; or a second feedback module, adapted to feed back negative acknowledgement NACK information if the DCI not used for scheduling is not received on the first PDCCH.

A start time of the step of determining, based on the DCI not used for scheduling, whether to monitor a second PDCCH is one of the following:

a slot next to a slot in which the DCI not used for scheduling is located;

a slot subsequent to a time gap after a slot in which the DCI not used for scheduling is located, where the gap is predefined or is configured by a network device; and an $M^{th}$ slot after a slot in which the ACK information is located, where M is a positive integer.

The DCI not used for scheduling includes a first indication field used to indicate at least one of the following of the terminal or a terminal group to which the terminal belongs:

not monitoring the second PDCCH within a first transmission time;

monitoring the second PDCCH within a second transmission time or not;

a monitoring parameter related to the second PDCCH;

a connected discontinuous reception CDRX parameter; and monitoring the second PDCCH based on received target signaling, where the target signaling is different from the DCI not used for scheduling, and the target signaling is used to indicate a monitoring parameter related to the second PDCCH.

The DCI not used for scheduling uses a dedicated DCI format; or the DCI not used for scheduling uses one of preset scheduling DCI formats or preset DCI not used for scheduling formats.

When the DCI not used for scheduling uses one of the preset scheduling DCI formats, the indication field includes at least one of the following fields in the preset scheduling DCI format: a hybrid automatic repeat request process number field, a redundancy version field, a modulation and coding scheme field, and a resource block assignment field.

The CDRX parameter includes at least one of a CDRX cycle, a CDRX offset, and a CDRX on-duration period.

The first indication field is used to indicate that the monitoring parameter related to the second PDCCH is one parameter in a monitoring parameter candidate set, and the monitoring parameter candidate set is indicated by the network device by using radio resource control RRC signaling.

The first indication field is used to indicate that the CDRX parameter is one parameter in a CDRX parameter candidate set, and the CDRX parameter candidate set is indicated by the network device by using radio resource control RRC signaling.

The first transmission time or the second transmission time is N time domain transmission units, N PDCCH monitoring periods, or N monitoring time domain transmission units in a PDCCH monitoring period, where the time domain transmission unit includes a slot, a mini-slot, a millisecond, or a time domain symbol, and N is a positive integer.

The terminal 300 further includes:
a reporting module, adapted to send report information to the network device, where the report information is used to indicate that the second PDCCH is not to be monitored within the first transmission time, or used to indicate whether the second PDCCH is to be monitored within the second transmission time.

The monitoring parameter related to the second PDCCH includes at least one of a monitoring period, a monitoring offset, and monitoring duration.

The second PDCCH corresponds to at least one DCI format; and/or the second PDCCH corresponds to at least one search space.

A monitoring parameter of the first PDCCH is configured by a network device; and the monitoring parameter includes at least one of a monitoring period, a monitoring offset, and monitoring duration.

The DCI not used for scheduling further includes a second indication field used to indicate a new data indication NDI of an uplink hybrid automatic repeat request HARQ process.

It should be noted that for the terminal in the embodiment of this disclosure, the DCI not used for scheduling is used to dynamically indicate whether to monitor the PDCCH, so that the terminal monitors the PDCCH more flexibly. This can avoid unnecessary PDCCH monitoring and is advantageous for power saving of the terminal.

Figure 4:
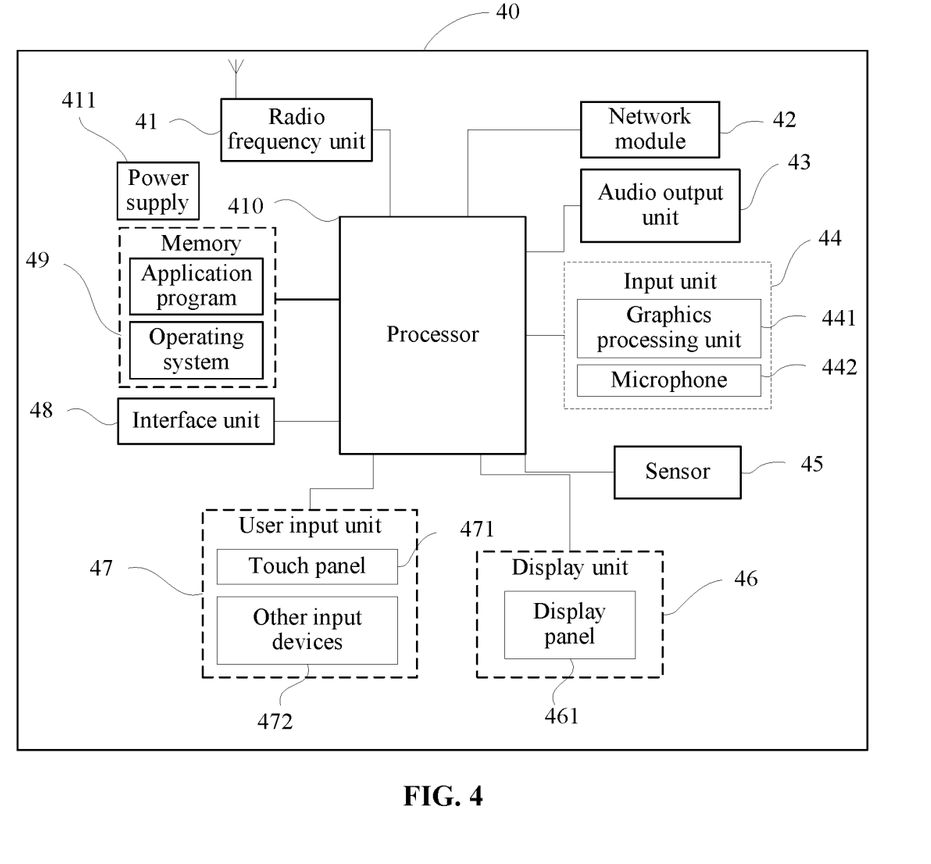
FIG. 4 presents a block diagram of a terminal according to an embodiment of this disclosure.

To better achieve the foregoing objective, further, FIG. 4 is a schematic diagram of a hardware structure of a terminal for implementing each embodiment of this disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 4 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 41 is adapted to receive or send data under control of the processor 410, and is specifically adapted to: monitor a first physical downlink control channel PDCCH; and if downlink control information (DCI) not used for scheduling is received on the first PDCCH, determine, based on the DCI not used for scheduling, whether to monitor a second PDCCH.

For the terminal in the embodiment of this disclosure, the DCI not used for scheduling is used to dynamically indicate whether to monitor the PDCCH, so that the terminal monitors the PDCCH more flexibly. This can avoid unnecessary PDCCH monitoring and is advantageous for power saving of the terminal.

It should be understood that in this embodiment of this disclosure, the radio frequency unit 41 may be adapted to receive and send signals in an information reception or transmission or call process. Specifically, after receiving downlink data from a base station, the radio frequency unit 41 sends the downlink data to the processor 410 for processing, and in addition, sends uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may further communicate with a network and another device through a wireless communications system.

The terminal provides wireless broadband Internet access for a user by using the network module 42, for example, helps the user send and receive e-mails, browse web pages, and access streaming media.

The audio output unit 43 may convert audio data received by the radio frequency unit 41 or the network module 42 or stored in the memory 49 into an audio signal and output the audio signal as a sound. In addition, the audio output unit 43 may further provide an audio output (for example, a call signal reception sound or a message reception sound) related to a specific function performed by the terminal 40. The audio output unit 43 includes a speaker, a buzzer, a receiver, and the like.

The input unit 44 is adapted to receive an audio or video signal. The input unit 44 may include a graphics processing unit (Graphics Processing Unit, GPU) 441 and a microphone 442, and the graphics processing unit 441 processes image data of a still picture or a video obtained by an image capture apparatus (for example, a camera) in an image capture mode or a video capture mode. A processed image frame may be displayed on the display unit 46. An image frame processed by the graphics processing unit 441 may be stored in the memory 49 (or another storage medium) or sent by the radio frequency unit 41 or the network module 42. The microphone 442 can receive a sound and can process the sound into audio data. The processed audio data may be converted in a telephone call mode into a format that can be sent by the radio frequency unit 41 to a mobile communications base station, for outputting.

The terminal 40 may further include at least one sensor 45 such as an optical sensor, a motion sensor, and other sensors. Specifically, the optical sensor includes an ambient light sensor and a proximity sensor, where the ambient light sensor can adjust luminance of a display panel 461 based on brightness of ambient light, and the proximity sensor can turn off the display panel 461 and/or backlight when the terminal 40 is moved to an ear. As a type of motion sensor, an accelerometer sensor can detect magnitudes of accelerations in all directions (usually three axes), can detect a magnitude and a direction of gravity when the mobile phone is in a stationary state, and can be applied to terminal posture recognition (such as screen switching between portrait and landscape, related games, and magnetometer posture calibration), functions related to vibration recognition (such as pedometer and tapping), and the like. The sensor 45 may further include a fingerprint sensor, a pressure sensor, an iris sensor, a molecular sensor, a gyroscope, a barometer, a hygrometer, a thermometer, an infrared sensor, and the like. Details are not described herein.

The display unit 46 is adapted to display information input by the user or information provided for the user. The display unit 46 may include the display panel 461. The display panel 461 may be configured in a form of a liquid crystal display (Liquid Crystal Display, LCD), an organic light-emitting diode (Organic Light-Emitting Diode, OLED), or the like.

The user input unit 47 may be adapted to receive input digit or character information, and generate a key signal input related to a user setting and function control of the terminal. Specifically, the user input unit 47 may include a touch panel 471 and other input devices 472. The touch panel 471, also referred to as a touchscreen, may capture a touch operation performed by a user on or near the touch panel (for example, an operation performed by the user on the touch panel 471 or near the touch panel 471 by using any appropriate object or accessory such as a finger or a stylus). The touch panel 471 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 410, and receives and executes a command sent by the processor 410. In addition, the touch panel 471 may be implemented in a plurality of forms, for example, as a resistive, capacitive, infrared, or surface acoustic wave touch panel. The user input unit 47 may further include the other input devices 472 in addition to the touch panel 471. Specifically, the other input devices 472 may include but are not limited to a physical keyboard, a function key (such as a volume control key or a power on/off key), a trackball, a mouse, and a joystick. Details are not described herein.

Further, the touch panel 471 may cover the display panel 461. After detecting a touch operation on or near the touch panel 471, the touch panel 471 transmits information about the touch operation to the processor 410 for the processor 410 to determine a touch event type, and then the processor 410 provides a corresponding visual output on the display panel 461 based on the touch event type. Although the touch panel 471 and the display panel 461 are used as two independent components to implement input and output functions of the terminal in FIG. 4, the touch panel 471 and the display panel 461 may be integrated to implement the input and output functions of the terminal in some embodiments. This is not specifically limited herein.

The interface unit 48 is an interface connecting an external apparatus to the terminal 40. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 48 may be adapted to receive an input (for example, data information or power) from an external apparatus, and transmit the received input to one or more components in the terminal 40, or may be adapted to transmit data between the terminal 40 and an external apparatus.

The memory 49 may be adapted to store a software program and various data. The memory 49 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 49 may include a high-speed random access memory, and may further include a non-volatile memory, for example, at least one magnetic disk storage device or a flash memory device, or another volatile solid-state storage device.

The processor 410 is a control center of the terminal. The processor 410 uses various interfaces and lines to connect all parts of the entire terminal, and performs various functions and data processing of the terminal by running or executing the software program and/or module stored in the memory 49 and invoking data stored in the memory 49, thereby performing overall monitoring on the terminal. The processor 410 may include one or more processing units. Optionally, an application processor and a modem processor may be integrated into the processor 410. The application processor mainly processes an operating system, a user interface, an application program, and the like. The modem processor mainly processes wireless communication. It can be understood that the modem processor may alternatively not be integrated in the processor 410.

The terminal 40 may further include the power supply 411 (for example, a battery) supplying power to all components. Optionally, the power supply 411 may be logically connected to the processor 410 through a power management system. In this way, functions such as charge management, discharge management, and power consumption management are implemented by using the power management system.

In addition, the terminal 40 includes some functional modules that are not shown, details of which are not described herein.

Optionally, an embodiment of this disclosure further provides a terminal, including: a processor 410, a memory 49, and a computer program stored in the memory 49 and capable of running on the processor 410. When the computer program is executed by the processor 410, the procedures in the foregoing embodiments of the channel monitoring indication method are implemented, with the same technical effect achieved. To avoid repetition, details are not described again herein. The terminal may be a wireless terminal or a wired terminal. The wireless terminal may be a device that provides the user with voice and/or other service data connectivity, a handheld device with a wireless connection function, or another processing device connected to a wireless modem. The wireless terminal may communicate with one or more core networks through a radio access network (Radio Access Network, RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (Personal Communication Service, PCS) phone, a cordless telephone set, a Session Initiation Protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), a user agent (User Agent), or a user device (User Device or User Equipment). This is not limited herein.

An embodiment of this disclosure further provides a computer-readable storage medium, where a computer program is stored in the computer-readable storage medium. When the computer program is executed by a processor, the procedures in the foregoing embodiments of the channel monitoring indication method can be implemented, with the same technical effect achieved. To avoid repetition, details are not described again herein. The computer-readable storage medium is, for example, a read-only memory (Read-Only Memory, ROM), a random access memory (Random Access Memory, RAM), a magnetic disk, or an optical disc.

The channel monitoring indication method in this disclosure is described from a terminal side in the foregoing embodiment. The following further describes a channel monitoring indication method on a network device side with reference to an accompanying drawing.

Figure 5:
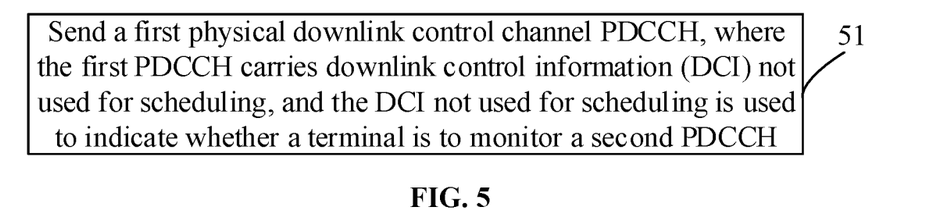
FIG. 5 presents a schematic flowchart of a channel monitoring indication method applied to a network device according to an embodiment of this disclosure.

As shown in FIG. 5, a channel monitoring indication method in an embodiment of this disclosure is applied to a network device side, and the method includes the following step.

Step 51: Send a first physical downlink control channel PDCCH, where the first PDCCH carries downlink control information (DCI) not used for scheduling, and the DCI not used for scheduling is used to indicate whether a terminal is to monitor a second PDCCH.

A monitoring parameter of the first PDCCH is configured by a network device; and the monitoring parameter includes at least one of a monitoring period, a monitoring offset, and monitoring duration. Because the DCI not used for scheduling dynamically indicates a monitoring behavior of the terminal, unnecessary PDCCH monitoring performed by the terminal can be avoided, and power consumption of the terminal is reduced. The second PDCCH in this embodiment of this disclosure corresponds to at least one DCI format, and/or the second PDCCH corresponds to at least one search space. For example, the second PDCCH corresponds to at least one of DCI not used for scheduling formats, or corresponds to at least one of DCI not used for scheduling formats, or corresponds to at least one of scheduling DCI formats and DCI not used for scheduling formats.

After step 51, the method further includes: receiving acknowledgement ACK information, where the ACK information is used to indicate that the terminal has received the DCI not used for scheduling on the first PDCCH; or receiving negative acknowledgement NACK information, where the NACK information is used to indicate that the terminal has not received the DCI not used for scheduling on the first PDCCH. To be specific, if it is defined that the terminal sends only the ACK information, the terminal feeds back the acknowledgement ACK information when the terminal has received the DCI not used for scheduling on the first PDCCH; or does not send any feedback information when the terminal has not received the DCI not used for scheduling on the first PDCCH. If it is defined that the terminal sends only the NACK information, the terminal does not send any feedback information when the terminal has received the DCI not used for scheduling on the first PDCCH, or feeds back the NACK information when the terminal has not received the DCI not used for scheduling on the first PDCCH. If it is defined that the terminal may not only send the ACK information but also send the NACK information, the terminal feeds back the ACK information when the terminal has received the DCI not used for scheduling on the first PDCCH, or feeds back the NACK information when the terminal has not received the DCI not used for scheduling on the first PDCCH.

In addition, a cyclic redundancy check CRC of the DCI not used for scheduling is scrambled by using a target radio network temporary identifier RNTI, and the target RNTI is a cell radio network temporary identifier C-RNTI or a dedicated RNTI.

In the DCI not used for scheduling in this embodiment of this disclosure, an effective time of an indication about whether the terminal is to monitor the second PDCCH is one of the following:
  a slot next to a slot in which the DCI not used for scheduling is located, that is, a next slot after the terminal receives the DCI not used for scheduling;
  a slot subsequent to a time gap after a slot in which the DCI not used for scheduling is located, where the gap is predefined or is configured by the network device; to be specific, a gap exists between reception of the DCI not used for scheduling and the effective time of the indication field, and in the gap, the terminal performs PDCCH monitoring based on a previous monitoring behavior rule; and
  an $M^{th}$ slot after a slot in which the ACK information corresponding to the DCI not used for scheduling is located, where M is a positive integer, and a value of M may be predefined or may be configured by the network device.

The DCI not used for scheduling includes a first indication field used to indicate at least one of the following monitoring behaviors of the terminal (for example, the first PDCCH is a dedicated PDCCH for the terminal) or a terminal group to which the terminal belongs (for example, the first PDCCH is a group-common Group-common PDCCH):

Not monitoring the second PDCCH within a first transmission time, where the first transmission time is N time domain transmission units, N second PDCCH monitoring (monitoring) periods, or N monitoring time domain transmission units in a second PDCCH monitoring period, where the time domain transmission unit includes a slot, a mini-slot, a millisecond, or a time domain symbol, and N is a positive integer. The scenario corresponds to the foregoing monitoring behavior 1, and therefore is not described again herein.

Monitoring the second PDCCH within a second transmission time or not, where the second transmission time is N time domain transmission units, N second PDCCH monitoring (monitoring) periods, or N monitoring time domain transmission units in a second PDCCH monitoring period, where the time domain transmission unit includes a slot, a mini-slot, a millisecond, or a time domain symbol, and N is a positive integer. The scenario corresponds to the foregoing monitoring behavior 2, and therefore is not described again herein.

Monitoring parameter related to the second PDCCH, where the monitoring parameter includes at least one of a monitoring period, a monitoring offset, and monitoring duration. For example, the indication field includes two bits, where 00 indicates that the monitoring period is 5 slots, 01 indicates that the monitoring period is 10 slots, 10 indicates that the monitoring period is 20 slots, and 11 represents other purposes. The network device may further indicate a monitoring parameter candidate set by using radio resource control RRC signaling, the monitoring parameter candidate set includes at least one monitoring parameter related to the second PDCCH, and the first indication field is used to indicate one parameter in the monitoring parameter candidate set. The scenario corresponds to the foregoing monitoring behavior 3, and therefore is not described again herein.

Connected discontinuous reception CDRX parameter, where the CDRX parameter includes at least one of a CDRX cycle, a CDRX offset, and a CDRX on-duration period. The network device may further indicate a CDRX parameter candidate set by using radio resource control RRC signaling, the CDRX parameter candidate set includes at least one CDRX parameter, and the first indication field is used to indicate one parameter in the CDRX parameter candidate set. The scenario corresponds to the foregoing monitoring behavior 4, and therefore is not described again herein.

Monitoring the second PDCCH based on received target signaling, where the target signaling is different from the DCI not used for scheduling, and the target signaling is used to indicate a monitoring parameter related to the second PDCCH. The scenario corresponds to the foregoing monitoring behavior 5, and therefore is not described again herein.

The DCI not used for scheduling may use a dedicated DCI format, that is, a DCI not used for scheduling format specially used for indicating a monitoring behavior of the terminal or the terminal group is added, where a length (Size) of the dedicated DCI format may be consistent or inconsistent with that of the DCI format (as shown in the foregoing Table 1) in the related art. Alternatively, the DCI not used for scheduling may use one of preset scheduling DCI formats or preset DCI not used for scheduling formats. Herein, the preset scheduling DCI formats may be the DCI formats 0_0, 0_1, 1_0, and 1_1 listed in the foregoing Table 1, and the preset DCI not used for scheduling formats may be other DCI formats in the foregoing Table 1. When the DCI not used for scheduling uses one of the preset scheduling DCI formats or the preset DCI not used for scheduling formats, a length of the DCI not used for scheduling is consistent with that of the DCI format in the related art, so that complexity of blind detection by the terminal can be reduced.

When the DCI not used for scheduling uses one of the preset scheduling DCI formats, the indication field includes at least one of the following fields in the preset scheduling DCI format: a hybrid automatic repeat request process number field, a redundancy version field, a modulation and coding scheme field, and a resource block assignment field. For an embodiment of rewriting some fields in the preset scheduling DCI format, refer to the embodiment of the terminal. Details are not described again herein.

Further, when the first indication field in the DCI not used for scheduling indicates that the monitoring behavior is 1 and/or 2, before step 51, the method further includes: receiving report information, where the report information is used to indicate that the second PDCCH is not to be monitored within the first transmission time, or used to indicate whether the second PDCCH is to be monitored within the second transmission time. The terminal sends report information to the network device according to a scheduling requirement of the terminal, and when there is no scheduling requirement, transmits report information indicating that the second PDCCH is not to be monitored within the first transmission time, or reports, based on a service scheduling requirement, report information indicating whether the second PDCCH is to be monitored within the second transmission time. The network device may generate the DCI not used for scheduling by referring to the report information, to indicate a subsequent monitoring behavior of the terminal. Further, for terminals whose report information indicates consistent content, the network device may generate a group-common PDCCH based on the report information.

In addition, the DCI not used for scheduling in this embodiment of this disclosure may further include a second indication field used to indicate a new data indication (New Data Indication, NDI) of an uplink hybrid automatic repeat request HARQ process. This indication field is used to instruct the terminal or the terminal group to release a soft buffer (soft buffer). Specifically, for uplink transmission, each HARQ process may correspond to one NDI.

In the channel monitoring indication method in this embodiment of this disclosure, the network device sends the PDCCH carrying the DCI not used for scheduling to the terminal, where the DCI not used for scheduling is used to indicate whether the terminal is to monitor the second PDCCH; and the terminal determines, based on the dynamic indication of the DCI not used for scheduling, whether to monitor the PDCCH, so that the terminal monitors the PDCCH more flexibly. This can avoid unnecessary PDCCH monitoring and is advantageous for power saving of the terminal.

The channel monitoring indication method in different scenarios is separately described in detail in the foregoing embodiment. A network device corresponding to the channel monitoring indication method is further described in the following embodiment with reference to an accompanying drawing.

Figure 6:
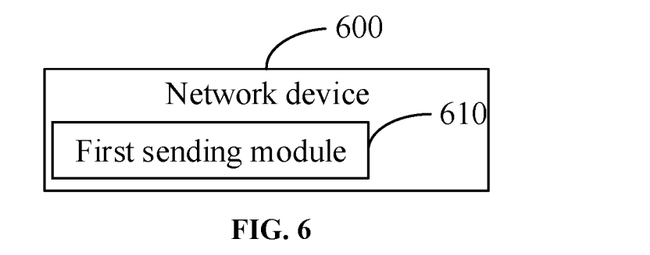
FIG. 6 presents a schematic modular structural diagram of a network device according to an embodiment of this disclosure.

As shown in FIG. 6, a network device 600 in an embodiment of this disclosure can implement details of the method in the foregoing embodiment, that is, sending a first physical downlink control channel PDCCH, where the first PDCCH carries downlink control information (DCI) not used for scheduling, and the DCI not used for scheduling is used to indicate whether a terminal is to monitor a second PDCCH, and can achieve a same effect. The network device 600 specifically includes the following functional module:

a first sending module 610, adapted to send a first physical downlink control channel PDCCH, where the first PDCCH carries downlink control information (DCI) not used for scheduling, and the DCI not used for scheduling is used to indicate whether a terminal is to monitor a second PDCCH.

A cyclic redundancy check CRC of the DCI not used for scheduling is scrambled by using a target radio network temporary identifier RNTI, and the target RNTI is a cell radio network temporary identifier C-RNTI or a dedicated RNTI.

The network device 600 further includes:
a first receiving module, adapted to receive acknowledgement ACK information, where the ACK information is used to indicate that the terminal has received the DCI not used for scheduling on the first PDCCH; or
a second receiving module, adapted to receive negative acknowledgement NACK information, where the NACK information is used to indicate that the terminal has not received the DCI not used for scheduling on the first PDCCH.

In the DCI not used for scheduling, a start effective time of an indication about whether the terminal is to monitor the second PDCCH is one of the following:
- a slot next to a slot in which the DCI not used for scheduling is located;
- a slot subsequent to a time gap after a slot in which the DCI not used for scheduling is located, where the gap is predefined or is configured by the network device; and
- an $M^{th}$ slot after a slot in which the ACK information is located, where M is a positive integer.

The DCI not used for scheduling includes a first indication field used to indicate at least one of the following of the terminal or a terminal group to which the terminal belongs:
- not monitoring the second PDCCH within a first transmission time;
- monitoring the second PDCCH within a second transmission time or not;
- a monitoring parameter related to the second PDCCH;
- a connected discontinuous reception CDRX parameter; and
- monitoring the second PDCCH based on received target signaling, where the target signaling is different from the DCI not used for scheduling, and the target signaling is used to indicate a monitoring parameter related to the second PDCCH.

The DCI not used for scheduling uses a dedicated DCI format; or the DCI not used for scheduling uses one of preset scheduling DCI formats or preset DCI not used for scheduling formats.

When the DCI not used for scheduling uses one of the preset scheduling DCI formats, the indication field includes at least one of the following fields in the preset scheduling DCI format: a hybrid automatic repeat request process number field, a redundancy version field, a modulation and coding scheme field, and a resource block assignment field.

The CDRX parameter includes at least one of a CDRX cycle, a CDRX offset, and a CDRX on-duration period.

The network device indicates a monitoring parameter candidate set by using radio resource control RRC signaling, the monitoring parameter candidate set includes at least one monitoring parameter related to the second PDCCH, and the first indication field is used to indicate one parameter in the monitoring parameter candidate set.

The network device indicates a CDRX parameter candidate set by using radio resource control RRC signaling, the CDRX parameter candidate set includes at least one CDRX parameter, and the first indication field is used to indicate one parameter in the CDRX parameter candidate set.

The first transmission time or the second transmission time is N time domain transmission units, N PDCCH monitoring periods, or N monitoring time domain transmission units in a PDCCH monitoring period, where the time domain transmission unit includes a slot, a mini-slot, a millisecond, or a time domain symbol, and N is a positive integer.

The network device 600 further includes:
a third receiving module, adapted to receive report information, where the report information is used to indicate that the second PDCCH is not to be monitored within the first transmission time, or used to indicate whether the second PDCCH is to be monitored within the second transmission time.

The monitoring parameter related to the second PDCCH includes at least one of a monitoring period, a monitoring offset, and monitoring duration.

The second PDCCH corresponds to at least one DCI format; and/or the second PDCCH corresponds to at least one search space.

The network device 600 further includes:
a configuration module, adapted to configure a monitoring parameter of the first PDCCH, where the monitoring parameter includes at least one of a monitoring period, a monitoring offset, and monitoring duration.

The DCI not used for scheduling further includes a second indication field used to indicate a new data indication NDI of an uplink hybrid automatic repeat request HARQ process.

It should be noted that, it should be understood that division of modules of the network device and the terminal is merely logical function division. The modules may be all or partially integrated in a physical entity or may be separated physically in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, the determining module may be a processing component that is separately disposed, or may be integrated in a chip of the apparatus for implementation. In addition, the determining module may be stored in a memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processing component, or by using instructions in a form of software.

For example, the modules may be configured as one or more integrated circuits for implementing the foregoing method, for example, one or more application-specific integrated circuits (Application-Specific Integrated Circuit, ASIC), or one or more microprocessors, or one or more digital signal processors (digital signal processor, DSP), or one or more field programmable gate arrays (Field Programmable Gate Array, FPGA). For another example, when one of the foregoing modules is implemented in a form of program code invoked by the processing component, the processing component may be a general purpose processor, for example, a central processing unit (Central Processing Unit, CPU) or another processor that may invoke program code. For another example, the modules may be integrated and implemented in a form of a system-on-a-chip (system-on-a-chip, SOC).

It should be noted that the network device in this embodiment of this disclosure sends the PDCCH carrying the DCI not used for scheduling to the terminal, where the DCI not used for scheduling is used to indicate whether the terminal is to monitor the second PDCCH; and the terminal determines, based on the dynamic indication of the DCI not used for scheduling, whether to monitor the PDCCH, so that the terminal monitors the PDCCH more flexibly. This can avoid unnecessary PDCCH monitoring and is advantageous for power saving of the terminal.

To better achieve the foregoing objective, an embodiment of this disclosure further provides a network device, including a processor, a memory, and a computer program stored in the memory and capable of running on the processor, where when the processor executes the computer program, the steps of the foregoing channel monitoring indication method are implemented. An embodiment of this disclosure further provides a computer-readable storage medium, where a computer program is stored in the computer-readable storage medium, and when the computer program is executed by a processor, the steps of the foregoing channel monitoring indication method are implemented.

Figure 7:
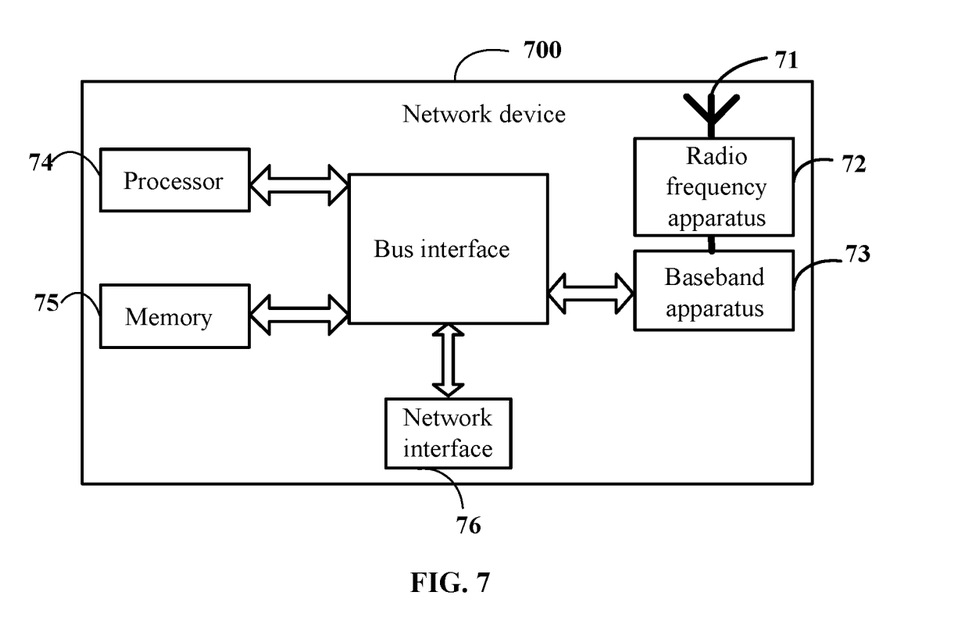
FIG. 7 presents a block diagram of a network device according to an embodiment of this disclosure.

Specifically, an embodiment of this disclosure further provides a network device. As shown in FIG. 7, the network device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-sent information, and sends the information to the radio frequency apparatus 72; and the radio frequency apparatus 72 processes the received information and then sends the information out by using the antenna 71.

The frequency band processing apparatus may be located in the baseband apparatus 73. The method performed by the network device in the foregoing embodiment may be implemented in the baseband apparatus 73, and the baseband apparatus 73 includes a processor 74 and a memory 75.

The baseband apparatus 73 may include, for example, at least one baseband processing unit, and a plurality of chips are disposed on the baseband processing unit. As shown in FIG. 7, one of the chips is, for example, the processor 74, connected to the memory 75, to invoke a program in the memory 75 to perform operations of the network device shown in the foregoing method embodiment.

The baseband apparatus 73 may further include a network interface 76, adapted to exchange information with the radio frequency apparatus 72, where the interface is, for example, a common public radio interface (common public radio interface, CPRI).

Herein, the processor may be one processor, or may be a collective term for a plurality of processing components. For example, the processor may be a CPU, or may be an ASIC, or is configured as one or more integrated circuits for implementing the method performed by the network device, for example, one or more microprocessors, one or more DSPs, or one or more field programmable gate arrays FPGAs. A storage component may be a memory, or may be a collective term for a plurality of storage components.

The memory 75 may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), and an electrically erasable programmable read-only memory (Electrically EPROM, EEPROM), or a flash memory. The volatile memory may be a random access memory (Random Access Memory, RAM), and the RAM is used as an external cache. For illustrative rather than restrictive description, a plurality of forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct memory bus random access memory (Direct Rambus RAM, DRRAM). The memory 75 described in this application is intended to include but is not limited to these and any other suitable types of memories.

Specifically, the network device in this embodiment of this disclosure further includes a computer program stored in the memory 75 and capable of running on the processor 74. The processor 74 invokes the computer program in the memory 75 to perform the method performed by each module shown in FIG. 6.

Specifically, when being invoked by the processor 74, the computer program may be adapted to: send a first physical downlink control channel PDCCH, where the first PDCCH carries downlink control information (DCI) not used for scheduling, and the DCI not used for scheduling is used to indicate whether a terminal is to monitor a second PDCCH.

The network device in this embodiment of this disclosure sends the PDCCH carrying the DCI not used for scheduling to the terminal, where the DCI not used for scheduling is used to indicate whether the terminal is to monitor the second PDCCH; and the terminal determines, based on the dynamic indication of the DCI not used for scheduling, whether to monitor the PDCCH, so that the terminal monitors the PDCCH more flexibly. This can avoid unnecessary PDCCH monitoring and is advantageous for power saving of the terminal.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A channel monitoring indication method, applied to a terminal and comprising:
monitoring a first physical downlink control channel PDCCH; and
if downlink control information (DCI) not used for scheduling is received on the first PDCCH, determining, based on the DCI not used for scheduling, whether to monitor a second PDCCH, and feeding back acknowledgement (ACK) information;
wherein the DCI not used for scheduling uses one of preset scheduling DCI formats.

2. The channel monitoring indication method according to claim 1, wherein a cyclic redundancy check CRC of the DCI not used for scheduling is scrambled by using a target radio network temporary identifier (RNTI), and the target RNTI is a cell radio network temporary identifier (C-RNTI) or a dedicated RNTI.

3. The channel monitoring indication method according to claim 1, wherein after the step of monitoring a first physical downlink control channel (PDCCH), the method further comprises:
if the DCI not used for scheduling is not received on the first PDCCH, feeding back negative acknowledgement (NACK) information.

4. The channel monitoring indication method according to claim 1, wherein a start time of the step of determining, based on the DCI not used for scheduling, whether to monitor a second PDCCH is one of the following:
a slot next to a slot in which the DCI not used for scheduling is located;
a slot subsequent to a time gap after a slot in which the DCI not used for scheduling is located, wherein the gap is predefined or is configured by the network device; and
an $M^{th}$ slot after a slot in which the ACK information is located, wherein M is a positive integer.

5. The channel monitoring indication method according to claim 1, wherein the DCI not used for scheduling comprises a first indication field used to indicate at least one of the following of the terminal or a terminal group to which the terminal belongs:
not monitoring the second PDCCH within a first transmission time;
monitoring the second PDCCH within a second transmission time or not;
a monitoring parameter related to the second PDCCH;
a connected discontinuous reception (CDRX) parameter; and
monitoring the second PDCCH based on received target signaling, wherein the target signaling is different from the DCI not used for scheduling, and the target signaling is used to indicate a monitoring parameter related to the second PDCCH.

6. The channel monitoring indication method according to claim 5, wherein the first indication field is used to indicate that the monitoring parameter related to the second PDCCH is one parameter in a monitoring parameter candidate set, and the monitoring parameter candidate set is indicated by the network device by using radio resource control RRC signaling.

7. The channel monitoring indication method according to claim 5, wherein the monitoring parameter related to the second PDCCH comprises at least one of a monitoring period, a monitoring offset, and monitoring duration.

8. The channel monitoring indication method according to claim 1, wherein when the DCI not used for scheduling uses one of the preset scheduling DCI formats, the indication field comprises at least one of the following fields in the preset scheduling DCI format: a hybrid automatic repeat request process number field, a redundancy version field, a modulation and coding scheme field, and a resource block assignment field.

9. A channel monitoring indication method, applied to a network device and comprising:
sending a first physical downlink control channel (PDCCH), wherein the first PDCCH carries downlink control information (DCI) not used for scheduling, and the DCI not used for scheduling is used to indicate whether a terminal is to monitor a second PDCCH;
wherein the channel monitoring indication method further comprises:
after the step of sending a first physical downlink control channel (PDCCH),
receiving acknowledgement (ACK) information, wherein the ACK information is used to indicate that the terminal has received the DCI not used for scheduling on the first PDCCH;
wherein the DCI not used for scheduling uses one of preset scheduling DCI formats.

10. The channel monitoring indication method according to claim 9, wherein a cyclic redundancy check (CRC) of the DCI not used for scheduling is scrambled by using a target radio network temporary identifier (RNTI), and the target RNTI is a cell radio network temporary identifier (C-RNTI) or a dedicated RNTI.

11. The channel monitoring indication method according to claim 9, wherein after the step of sending a first physical downlink control channel (PDCCH), the method further comprises:
receiving negative acknowledgement (NACK) information, wherein the NACK information is used to indicate that the terminal has not received the DCI not used for scheduling on the first PDCCH.

12. The channel monitoring indication method according to claim 11, wherein in the DCI not used for scheduling, a start effective time of an indication about whether the terminal is to monitor the second PDCCH is one of the following:
a slot next to a slot in which the DCI not used for scheduling is located;
a slot subsequent to a time gap after a slot in which the DCI not used for scheduling is located, wherein the gap is predefined or is configured by the network device; and
an $M^{th}$ slot after a slot in which the ACK information is located, wherein M is a positive integer.

13. The channel monitoring indication method according to claim 9, wherein when the DCI not used for scheduling uses one of the preset scheduling DCI formats, the indication field comprises at least one of the following fields in the preset scheduling DCI format: a hybrid automatic repeat request process number field, a redundancy version field, a modulation and coding scheme field, and a resource block assignment field.

14. The channel monitoring indication method according to claim 9, wherein the DCI not used for scheduling comprises a first indication field used to indicate at least one of the following of the terminal or a terminal group to which the terminal belongs:
not monitoring the second PDCCH within a first transmission time;
monitoring the second PDCCH within a second transmission time or not;

a monitoring parameter related to the second PDCCH;
a connected discontinuous reception (CDRX) parameter; and
monitoring the second PDCCH based on received target signaling, wherein the target signaling is different from the DCI not used for scheduling, and the target signaling is used to indicate a monitoring parameter related to the second PDCCH.

15. The channel monitoring indication method according to claim 14, wherein the network device indicates a monitoring parameter candidate set by using radio resource control (RRC) signaling, the monitoring parameter candidate set comprises at least one monitoring parameter related to the second PDCCH, and the first indication field is used to indicate one parameter in the monitoring parameter candidate set.

16. A network device, comprising a processor, a memory, and a computer program stored in the memory and capable of running on the processor, wherein the computer program is executed by the processor to implement:
sending a first physical downlink control channel (PDCCH), wherein the first PDCCH carries downlink control information (DCI) not used for scheduling, and the DCI not used for scheduling is used to indicate whether a terminal is to monitor a second PDCCH;
wherein the computer program is further executed by the processor to implement:
receiving acknowledgement (ACK) information, wherein the ACK information is used to indicate that the terminal has received the DCI not used for scheduling on the first PDCCH;
wherein the DCI not used for scheduling uses one of preset scheduling DCI formats.

17. The network device according to claim 16, wherein a cyclic redundancy check CRC of the DCI not used for scheduling is scrambled by using a target radio network temporary identifier (RNTI), and the target RNTI is a cell radio network temporary identifier (C-RNTI) or a dedicated RNTI.

18. The network device according to claim 16, wherein the computer program is further executed by the processor to implement:
receiving negative acknowledgement (NACK) information, wherein the NACK information is used to indicate that the terminal has not received the DCI not used for scheduling on the first PDCCH.

19. The network device according to claim 16, wherein the DCI not used for scheduling comprises a first indication field used to indicate at least one of the following of the terminal or a terminal group to which the terminal belongs:
not monitoring the second PDCCH within a first transmission time;
monitoring the second PDCCH within a second transmission time or not;
a monitoring parameter related to the second PDCCH;
a connected discontinuous reception (CDRX) parameter; and
monitoring the second PDCCH based on received target signaling, wherein the target signaling is different from the DCI not used for scheduling, and the target signaling is used to indicate a monitoring parameter related to the second PDCCH.

20. The network device according to claim 19, wherein when the DCI not used for scheduling uses one of the preset scheduling DCI formats, the indication field comprises at least one of the following fields in the preset scheduling DCI format: a hybrid automatic repeat request process number field, a redundancy version field, a modulation and coding scheme field, and a resource block assignment field; or
- wherein the network device indicates a monitoring parameter candidate set by using radio resource control (RRC) signaling, the monitoring parameter candidate set comprises at least one monitoring parameter related to the second PDCCH, and the first indication field is used to indicate one parameter in the monitoring parameter candidate set; or
- wherein the monitoring parameter related to the second PDCCH comprises at least one of a monitoring period, a monitoring offset, and monitoring duration.

* * * * *